United States Patent [19]

Fujii et al.

[11] Patent Number: 4,814,085

[45] Date of Patent: Mar. 21, 1989

[54] FIXING CARRIER FOR ACTIVATED SLUDGE IN SEWAGE OR WASTE WATER TREATMENT

[75] Inventors: Masahiro Fujii; Osamu Miki, both of Kitakyushu; Takehisa Muronaga; Takaharu Fujii, both of Nishimatsuura, all of Japan

[73] Assignees: Nippon Steel Corporation, Tokyo; Iwao Jiki Kogyo Co., Ltd., Saga, both of Japan

[21] Appl. No.: 226,085

[22] Filed: Jul. 29, 1988

Related U.S. Application Data

[62] Division of Ser. No. 98,465, Sep. 18, 1987.

[30] Foreign Application Priority Data

Sep. 19, 1986 [JP] Japan .............................. 61-221651

[51] Int. Cl.$^4$ .............................................. C02F 3/10
[52] U.S. Cl. ................................ 210/510.1; 261/94; 501/83; 501/84; 210/150
[58] Field of Search .............................. 210/615–618, 210/150, 151, 510.1; 261/94–96; 55/523; 501/80–85; 264/42–44

[56] References Cited

U.S. PATENT DOCUMENTS

| | | | |
|---|---|---|---|
| 3,887,671 | 6/1975 | Metzger | 264/43 |
| 3,944,425 | 3/1976 | Magder | 501/84 |
| 4,162,166 | 7/1979 | Wells-Muycelo | 501/80 |
| 4,208,284 | 6/1980 | Pretorius | 261/94 X |
| 4,261,938 | 4/1981 | Engström et al. | 264/43 |
| 4,274,966 | 6/1981 | Palmer | 210/618 |
| 4,560,478 | 12/1985 | Narumiya | 210/510.1 X |
| 4,678,758 | 7/1987 | Kampfer et al. | 210/510.1 X |
| 4,758,538 | 7/1988 | Satoh et al. | 501/84 |

FOREIGN PATENT DOCUMENTS 57-75189 5/1982 Japan .
61-136490 6/1986 Japan .
61-136491 6/1986 Japan .

*Primary Examiner*—Tom Wyse
*Attorney, Agent, or Firm*—Wenderoth, Lind & Ponack

[57] ABSTRACT

A fixing carrier for fixing an activated sludge employed in a sewage or waste-water treatment in which:

a clay, containing kaolinite minerals, of from 10 to 40 parts by weight and a foaming agent of from 5 to 20 parts by weight are blended with a granulated blast furnace slag of from 60 to 90 parts by weight in the presence of water to prepare a wet mixture which is kneaded and shaped into a shaped mixture; and said shaped mixture is baked at a baking temperature of less than 950° C. at maximum, with the proviso that each of a heat-up time required of said shaped mixture to reach said baking temperature for producing a baked product and a heat-down time required of said baked product to reach a temperature of up to 100° C. is about one hour.

6 Claims, 1 Drawing Sheet

FIXING CARRIER FOR ACTIVATED SLUDGE IN SEWAGE OR WASTE WATER TREATMENT

CROSS-REFERENCE TO RELATED APPLICATION

This is a division application of U.S. application Ser. No. 07/098,465 filed Sept. 18, 1987.

BACKGROUND OF THE INVENTION

1. Field of the Invention

The present invention relates to a fixing carrier for fixing an activated sludge employed in a biochemical treatment of waste waters such as sewage or industrial waste waters containing organic matters.

2. Description of the Prior Art

Hitherto, in order to remove the organic matters from the waste water, a biochemical treatment of the waste water employing microorganisms has been employed. As this treatment, an activated-sludge treatment process is generally conducted: an activated sludge (an aggregation of microorganisms) is suspended and aerated in an aeration tank of a waste-water treatment apparatus so that pollutants contained in the waste water are decomposed and removed. However, such activated-sludge treatment process has problems that pollutant, loading per unit of aeration-tank volume is too small and that a large amount of excess sludge is produced.

These problems are resolved by a prior art described in Japanese Laid-Open Patent Publication No. 60-150893 relating to a fixing carrier for the activated sludge (microorganisms) employed in the biochemical treatment of waste water, which carrier is constructed of inorganic-foam pellets having a mean-particle diameter of nothing smaller than 2 mm and a specific gravity of up to 1.5. The pellets are prepared as follows: first, a foaming agent and a glass-forming agent are blended with expansible minerals, non-expansible minerals or refractories to prepare a mixture which is then powdered and shaped; and the pelleted mixture is baked into the above inorganic-foam pellets. In addition, in order to resolve the above problems, another proposal is made, in which crushed stones are employed as the fixing carrier for the activated sludge employed in the activated-sludge treatment process. Further another proposal is also made in a published document Yousui Haisui Handbook (2) "(Handbook (2) of Water and Waste Water)" published by Sangyo Yousui Chosa Kai "(A Board of Investigation of Industrial Waste Water)" on Nov. 30, 1974, pp. 823-824, FIGS. 3 and 4. This proposal relates to an activated-sludge treatment process in which a honeycomb-like fixed-bed type carrier made of plastics serves as a carrier for the activated sludge and is disposed in a biochemical-reaction tank of a waste-water treatment apparatus.

However, the above-mentioned prior art and proposals suffer from many problems.

For example, as for the inorganic-foam pellets disclosed in the Japanese Laid-Open Patent Publication No. 60-150893, a complex-production process thereof makes it difficult to provide such pellets at low cost. In addition, in the biochemical treatment of the waste water, foams or pores in the pellet are filled with water to increase apparent specific gravity of the pellet. This deteriorates flow properties of the pellet to cause the pellet so to be deposited in a dead space of the aeration tank or reactor. As a result, in such dead space, the activated sludge fixed to the pellets dies from lack of oxygen, accumulates to make the space anaerobic and rots to produce a harmful gases, for example such as hydrogen sulfide and the like. The hydrogen sulfide and like harmful gases deteriorate the functions of the activated sludge, so that a treatment performance of the aeration tank employing the above inorganic-foam pellets becomes remarkably poor. On the other hand, in case that the inorganic material is foamed to have an apparent specific gravity of up to 1.5, the pellet is greatly occupied by volume of the foams or pores while poor in its sturctural strength, which leads to breakdown of the pellet in its use for a long period of time.

In case that the crushed stone is employed as the fixing carrier for the activated sludge, the crushed stone is poor in both surface area to weight ratio and surface area to volume ratio. For example, as for a crushed stone having a diameter of 50 mm, its surface area to volume ratio is only 90 $m^2/m^3$. In this case, due to a lack of an effective surface area for fixing the activated sludge (microorganisms), it is impossible to retain a sufficient amount of the activated sludge (microorganisms) in the biochemical-reaction tank so that a treatment efficiency of waste water by sue of such biochemical-reaction tank is remarkably low. Further, a porosity of the crushed stone is about 35%. Since this value is very small, voids or pores of the crushed stone are immediately clogged with the activated sludge having proliferated. In order to prevent the voids or pores of the crushed stone from being clogged with the proliferated activated sludge, it is necessary to frequently conduct a washing operation of the crushed stone serving as the fixing carrier for the activated sludge. Incidentally, the crushed stone has a defect that the porosity of the crushed stone decreases as the surface area of the same increases. In case that the honeycomb-like fixed-bed type carrier made of plastics and the like is employed as the fixing carrier for the activated sludge, the honeycomb construction of such carrier is readily clogged with the proliferated activated sludge. In addition, such honeycomb construction has a problem in that it is difficult to realize a steady activated sludge layer therein: the activated sludge once fixed o the honeycomb construction readily drops out of the construction to deteriorate a quality of a treated water.

As described above, since the conventional fixing carrier for the activated sludge employed in the sewage or waste-water treatment process has many problems, it is difficult to employ such conventional fixing carrier in a large-scale treatment of sewage and other waste water, for example such as: ammonia liquors discharged from coke ovens of ironworks; waste water discharged from coal-gasification or liquefaction plants; waste water produced in the petroleum-refining process; waste water discharged from food-processing plants; waste water discharged from fermentation plants of alcohol and the like; and like waste waters.

SUMMARY OF THE INVENTION

It is an object of the present invention to resolve the above problems by providing a novel fixing carrier for fixing the activated sludge (microoranisms) sludge employed in the sewage or waste-water treatment.

In order to accomplish the above object, various materials have been reviewed as to a raw materials of the fixing carrier for the activated sludge (microorganisms). The inventors of the present application found that of these materials, a granulated blast furnace is the most excellent as raw materials. The granulated blast furnace slag is produced by obtaining a slag as a by-product when pig iron is produced in the blast furnace of ironworks, and subsequently by chilling the slag suddenly by use of a highly-pressurized water. Consequently, on the basis of the above finding, in Japanese Patent Application Nos. 61-184934 (filed: Aug. 6, 1986) and 61-184935 (filed: Aug. 6, 1986), inventors of the present application have proposed a fixed-bed type activated-sludge treatment process which is characterized by a ceramic carrier for fixing the activated sludge in the aeration tank, a principal component of which ceramic carrier is the granulated blast furnace slag. These Japanese Patent Applications corresponds to the pending U.S. patent application (Masahiro FUJII et al.) filed on Aug. 6, 1987.

The inventors of the present application continued their researches and found an improved ceramic material having a pore size suitable for fixing the activated sludge employed in the biochemical treatment of the sewage or industrial waste water.

The reasons why the inventors of the present application employ the granulated blast furnace slag as a principal component of the fixing carrier for the activated sludge (microorganisms) employed in the sewage or waste-water treatment are as follows:

(1) since the granulated blast furnace slag is a by-product in the ironworks, it costs little and its composition is stable;

(2) A finely-powdered, granulated blast furnace slag serves well as the fixing carrier for the activated sludge, so that a ceramic material a principal component of which is made of the granulated blast furnace slag is excellent in fixing performance as to the activated sludge, and (3) Since the granulated blast furnace slag contains CaO by an amount of from 42 to 45% by weight, the ceramic material containing the granulated blast furnace slag as its principal component can be produced at the baking temperature lower than that of a ceramic material containing alumina or silica as its principal component.

As described above, the granulated blast furnace slag is excellent as a raw material of the fixing carrier for the activated sludge (microorganisms). However, it is not possible to obtain a ceramic material suitable for fixing the activated sludge by the use of the granulated blast furnace slag only, so suitable additives such as a binder, a foaming agent and the like must be blended with the granulated blast furnace slag for obtaining the ceramic material suitable for fixing the activated sludge.

As for the binder, the inventors of the present application found that clays were materials adapted to be formed as the binder, among which clays a clay containing kaolinite minerals is provided with a large affinity to the granulated blast furnace slag while excellent in molding and processing. In addition, the inventors of the present application also found that properties of the foaming agent exerted a powerful influence on a formation process of fine pores of the ceramic material, which fine pores exert a powerful influence on the fixing performance of the ceramic material as to the activated sludge.

On the basis of the above findings, the inventors of the present application made the present invention as to the fixing carrier for the activated sludge employed in the sewage or waste-water treatment, which carrier costs little and is excellent in both structural strength and fixing performance as to the activated sludge (microorganisms). In addition, in preparation, the raw materials of the fixing carrier is also excellent in formability.

The gist of the present invention resides in the following:

A fixing carrier for fixing an activated sludge (microorganisms) employed in a sewage or waste-water treatment, characterized in that:

a clay, containing kaolinite minerals, of from 10 to 40 parts by weight and a foaming agent of from 5 to 20 parts by weight are blended with a granulated blast furnace slag of from 60 to 90 parts by weight in the presence of water to prepare a wet mixture which is kneaded and shaped into a shaped mixture; and said shaped mixture is baked at a baking temperature of less than 950° C. at maximum, with the proviso that a heating time required so that the shaped mixture may reach the baking temperature for producing a baked product is about one hour and that a cooling time required so that the heated, shaped mixture may reach a temperature of up to 100° C. is also about one hour.

BRIEF DESCRIPTION OF THE DRAWINGS

FIG. 1(a) is a strabismic view of one embodiment of the saddle-shaped form;

FIG. 1(b) is a front view of the embodiment of FIG. 1(a) seen in the direction indicated by the arrow of FIG. 1(a); and FIG. 1(c) is a cross section of the embodiment of FIG. 1(a) taken in the direction perpendicular to the embodiment of FIG. 1(b).

DESCRIPTION OF THE PREFERRED EMBODIMENTS

Figure 1A:
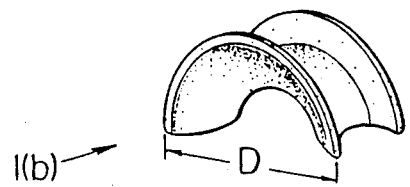
FIGS. 1(a)–1(c) show a schematic view according to one embodiment of the fixing carrier of the present invention.

According to the present invention, an improved fixing carrier for fixing the activated sludge (microorganisms) is prepared as follows: first, a clay containing kaolinite minerals and a foaming agent are blended with the granulated blast furnace slag in the presence of water to prepare a wet mixture which is shaped into a shaped mixture having a predetermined form such as a ring-like form or a saddle-like form, and then the thus shaped mixture is baked into a final product, i.e., the improved fixing carrier of the present invention.

Now, will be described hereinbelow a process for producing the fixing carrier of the present invention for fixing the activated sludge (microorganisms) employed in the sewage or waste-water treatment.

First, the clay and the foaming agent are blended with the granulated blast furnace slag which is a principal component of the fixing carrier of the present invention. The obtained mixture is shaped in the presence of water into the shaped mixture having the predetermined form such as the ring-like form or the saddle-like form. In this case, a grain size of the granulated blast furnace slag is preferably within a range of from about 20 to about 200 μm. When the grain size of the granulated blast furnace slag is less than 20 μm, the density of the fixing carrier becomes too excessive at the time of baking so that the fixing carrier impairs its adherability for the activated sludge. On the other hand, when the grain size of the granulated blast furnace slag is over 200

μm, the baked final product or fixing carrier has an excess porosity to deteriorate in its structural strength.

As for the clays, clays containing the kaolinite minerals, for example such as Kibushi clay and Kaerume clay and the like are preferable. Namely, among the various clays, the clays containing the kaolinite minerals have a large affinity to the granulated blast furnace slag while since they are excellent in molding and processing, they are easily shaped into various forms. In addition, when the clay containing the kaolinite minerals is used, it is hard that the cracking and the like develop in the shaped form of the fixing carrier in the baking process.

As for the foaming agent, there is a combustible material, for example such as thermoplastic-resin, sawdust, rice bran, walnut-shell flour, coke dust and the like. However, in order to improve the fixing performance of the fixing carrier for the activated sludge, it is preferable to employ a foaming agent such as calcium carbonate, sodium carbonate, potassium carbonate and like carbonate: the foaming agent is pyrolytically decomposed at a temperature of from 750° to 900° C. which is lower than the baking temperature of the ceramic material by an amount of from 50° to 200° C., so that gasses are produced.

Any of the above carbonates is pyrolytically decomposed at a temperature of from 750° to 900° C. to produce a carbon-dioxide gas which forms numerous fine pores in the ceramic material during its melting/baking operation. Consequently, after completion of the baking operation, the numerous pores having a pore size suitable for fixing the activated sludge are formed in the surface of the thus baked ceramic material or fixing carrier of the present invention.

In this case, since the conventional combustible foaming agent burns at a temperature of from 400° to 600° C., there is a fear that a part of formed pores are closed if the baking temperature reaches 950° C. In contrast with this, since the foaming agent of the present invention made of carbonates forms the pores at a temperature of from 750° to 900° C., there is no fear that the thus formed pores are closed, even when the baking temperature reaches 950° C.

In blending of the clay containing the kaolinite minerals and the foaming agent with the granulated blast furnace slag, in order to ensure an ease of sintering and a suitable porosity together with a sufficient structural strength of the ceramic material, it is preferable to blend a 10 to 40 parts by weight of the clay and a 5 to 20 parts by weight of the foaming agent with a 60 to 90 parts by weight of the granulated blast furnace slag. Particularly, in this case, when the clay is less than 10 parts by weight, it is hard for the clay to serve as an effective inorganic binder, which makes it impossible to obtain a fixing carrier having a sufficient strength. On the other hand, when the clay is over 40 parts by weight, it is hard for the clay to be rapidly baked. Incidentally, when the foaming agent is over 20 parts by weight, it is impossible to obtain a final product having a sufficient strength.

In preparation of the fixing carrier of the present invention for the activated sludge (microorganisms), the clay and the foaming agent described above are blended with the granulated blast furnace slag having the above grain size and kneaded in the presence of water to prepare the wet mixture which is shaped into the shaped mixture having the predetermined form such as the ring-like form, saddle-like form and the like through an extrusion-molding process or a pressure-molding process. The thus shaped mixture is then baked at a suitable baking temperature, for example, at a baking temperature of 950° C. or 900° C. at maximum, provided that each of a heat-up time required of the shaped mixture to reach the baking temperature for producing a baked final product and a heat-down time required of the thus produced final product to reach a temperature of up to 100° C. is about one hour. The thus produced baked product having the granulated blast furnace slag and the clay as its principal components constitutes a most suitable fixing carrier for fixing the activated sludge (microorganisms) employed in the sewage or waste-water treatment.

Incidentally, in addition to the granulated blast furnace slag, as a raw material of the fixing carrier for the activated sludge (microorganisms) employed in the sewage or waste-water treatment, it is also employed any other suitable slag such as an air-cooled blast furnace slag which originates in the blast furnace of the ironworks, a converter slag which originates in the converter and the like.

According to the present invention, the principal component of the fixing carrier for the activated sludge (microorganisms) employed in the sewage or waste-water treatment is made of a pig-iron slag and a steel slag both produced in the ironworks, and more particularly made of the granulated blast furnace slag. Since any of the above slags contains components such as calcium components, magnesium components, iron components, phosphorus components and like components which are nutrients for the microorganisms, these slags are excellent in affinity to the activated sludge (microorganisms). In addition, the fixing carriers of the present invention having a predetermined form are randomly loaded in the aeration tank to form an aggregation of the fixing carriers for the activated sludge in the aeration tank so that the porosity of such fixing carriers is large making it possible to retain activated sludge is retained also in gaps formed between the fixing carriers of such aggregation, whereby it is pbssible to keep the activated sludge at a high-concentration level in the aeration tank. Incidentally, in case that these gaps are clogged with the activated sludge (microorganisms), it is possible to easily remove the excess sludge (microorganisms), from these gaps through a rinsing operation.

Hereinbelow will be described examples of the fixing carrier, of the present invention.

EXAMPLE 1

The following raw materials were mixed with each other in a dry condition by use of a raw-material kneader to prepare a dry mixture:
a 70 parts by weight of the granulated blast furnace slag;
a 30 parts by weight of the Kibushi clay; and
a 10 parts by weight of the foaming agent (sawdust).

The thus obtained dry mixture was kneaded in the presence of water to prepare a wet mixture which was shaped into a shaped mixture having a ring-like form having an outer diameter of 25 mm, a height of 25 mm and a adial thickness of 3 mm by sue of a vacuum-type extrusion molding machine. Then, the thus shaped mixture was dried and thereafter received in a conveyor-type electric furnace so as to be heated to a temperature of 900° C. therein and then cooled. In this case, it was conducted to heat the shaped mixture to the temperature of 900° C. by taking about one hour and subsequently it was conducted to cool the heated, shaped mixture from the temperature of 900° C. to the temperature of not more than 100° C. by taking about one hour. The thus produced ring-like fixing carrier for the activated sludge had a total surface area of 284 m²/fixing carrier m³, a specific surface of 1.24 m²/g, a pore diameter of up to 100 μm, a crushing strength of from 10 to 40 Kgf, a bulk specific gravity of 0.36, a porosity of an aggregation of the fixing carriers having been disorderly loaded in the aeration tank being 70%.

EXAMPLE 2

The following raw materials were mixed with each other in the same manner as that of the Example 1 to prepare a dry mixture:
a 80 parts by weight of the granulated blast furnace slag;
a 20 parts by weight of the Kaerume clay; and
a 15 parts by weight of the foaming agent (calcium carbonate).

Figure 1B:
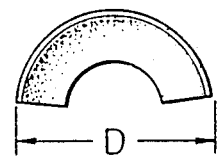
Figure 1C:

The thus prepared dry mixture was kneaded in the presence of water to prepare a wet mixture which was shaped into a shaped mixture having a U-shaped form by use of a vacuum-type extrusion molding machine. Then, the U-shaped mixture was reshaped into a saddle-shaped form which is like a saddle to be put on a horse and that has an outer diameter (D) of a size of ⅜ inch (9.525 mm) through a roll-type forming machine, as shown by FIGS. 1(a)–1(c). After that, the thus reshaped mixture was placed on a netted conveyor of the electric furnace. In the electric furnace, it was conducted to heat the shaped mixture to the temperature of 950° C. by taking about one hour and subsequently it was conducted to cool the heated, shaped mixture from the temperature of 950° C. to the temperature of not more than 100° C. by taking about one hour. The thus produced, saddle-shaped fixing carrier for the activated sludge had a total surface area of 787 m²/m³, a specific surface of 0.67 m²/g, a pore diameter of up to 100 μm, a crushing strength of from 10 to 14 Kgf, a bulk specific gravity of 0.32, and a porosity of an aggregation of the fixing carriers having been disorderly loaded in the aeration tank being 77%.

EXAMPLE 3

A cassette having a capacity of 20 liters, filled with the ring-like fixing carriers of the Example 1 of the present invention or the saddle-shaped fixing carriers of the Example 2 of the present invention, was set in a biochemical-reaction tank having a capacity of 40 liters, in which tank received ar activated-sludge mixture liquid having an activated-sludge concentration of about 2500 mg/liter taken from an aeration tank of an activated-sludge treatment plant for a sewage. Then, the activated-sludge mixture liquid was subjected to an aeration operation in the biochemical-reaction tank. As a result, the activated sludge was fixed to the interior of the cassette after 10 to 15 hours from the beginning of such aeration operation. After that, an artificial sewage having a mean $BOD_5$ concentration of 128 mg/liter was biochemically treated with the use of the above cassette for a treatment time of 16 hours, 12 hours, 8 hours and 6 hours, respectively. Incidentally, in this case, a sludge thickener tank was eliminated so that a return operation of the activated sludge was not conducted.

As a result, in any of the above fixing carriers of the Examples 1 and 2 of the present invention and in any of the above treatment times, it was possible to obtain a well-treated water having a BOD level of up to 5 mg/liter, a COD level of from 5 to 15 mg/liter, and a suspended-solid concentration of from 5 to 15 mg/liter.

In this case, the activated sludge substantially did not drop out of the cassette filled with the fixing carriers of the present invention, which clarifies the fact that the activated sludge is steadily fixed to the fixing carriers of the present invention.

The fixing carrier of the present invention enables the treatment time of the waste water to be cut about ½ to about ⅓, so as to remarkably improve the treatment efficiency of the waste water.

As described above, since the fixing carrier of the present invention employs the slags originating in the ironworks as its principal component, the raw material thereof costs little. In addition, of these slags, each of the blast furnace slag and the converter slag contains CaO at a high concentration so that the fixing carrier of the present invention containing such slag is lower in baking temperature than the other analogous baked product, which enables the fixing carrier of the present invention to be rapidly baked so that a baking operation thereof costs little. In addition, since the fixing carrier of the present invention employs the clay containing the kaolinite minerals as its binder, the fixing carrier of the present invention is excellent in molding and processing in its preparation while provided with a large resistance to cracking at the time of baking, which leads to a sufficient structural strength. Further, since the fixing carrier of the present invention contains the nutrients for the activated sludge (microorganisms), for example such as calcium, magnesium, iron, phosphorus and the like, it huas a large affinity to the activated sludge (microorganisms).

Further, the fixing carrier of the present invention has the ring-like form or a saddle-shaped form so that its surface area is large, which leads to a sufficient amount of gaps formed between the fixing carriers of the present invention loaded in the aeration thank. As a result, a large amount of the activated sludge can be retained in such gaps to make it possible to save the biochemical-reaction tank of the waste-water treatment apparatus in volume to an amount of from about ½ to ⅓. In addition, since the activated sludge can be retained in the gaps between fixing carriers, it is possible to substantially prevent the excess sludge from flowing out of the biochemical-reaction tank, so that it is also possible to simplify the sludge thickener tank in its construction.

What is claimed:

1. A porous fixing carrier for fixing an activated sludge employed in a sewage or waste-water treatment comprising a baked and shaped mixture of 10 to 40 parts by weight of a clay containing Kaolinite materials, 5 to 20 parts by weight of a foaming agent and 60 to 90 parts by weight of a granulated blast furnace slag.

2. The fixing carrier for fixing an activated sludge as set forth in claim 1, wherein: the grain size of said granulated blast furnace slag is within the range of from 20 to 200 microns.

3. The fixing carrier for fixing an activated sludge as set forth in claim 1, wherein said clay containing said kaolinite materials contains at least one clay selected from the group consisting of Kibushi clay and Kaerume clay.

4. The fixing carrier for fixing an activated sludge as set forth in claim 1, wherein said foaming agent contains at least one carbonate selected from the group consisting of calcium carbonate, sodium carbonate and potassium carbonate.

5. The fixing carrier for an activated sludge as set forth in claim 1, wherein said foaming agent contains at least one combustible material selected from the group consisting of a thermoplastic resin made of a polythylene glycol or a phenolic resin, sawdust, rice bran, walnut-shell flour, and coke dust.

6. The fixing carrier for fixing the activated sludge as set forth in claim 1, wherein said shaped mixture has a ring-like form or a saddle-shaped form.

* * * * *